US012599992B2

(12) United States Patent
Haug

(10) Patent No.: US 12,599,992 B2
(45) Date of Patent: Apr. 14, 2026

(54) SUPPORTING DEVICE FOR A LASER PROCESSING MACHINE AND LASER PROCESSING MACHINE

(71) Applicant: TRUMPF Werkzeugmaschinen SE + Co. KG, Ditzingen (DE)

(72) Inventor: Thomas Haug, Veringenstadt (DE)

(73) Assignee: TRUMPF WERKZEUGMASCHINEN SE + CO. KG, Ditzingen (DE)

( * ) Notice: Subject to any disclaimer, the term of this patent is extended or adjusted under 35 U.S.C. 154(b) by 920 days.

(21) Appl. No.: 17/882,631

(22) Filed: Aug. 8, 2022

(65) Prior Publication Data

US 2022/0379414 A1     Dec. 1, 2022

Related U.S. Application Data

(63) Continuation of application No. PCT/EP2021/053221, filed on Feb. 10, 2021.

(30) Foreign Application Priority Data

Feb. 11, 2020     (DE) ..................... 10 2020 103 484.9

(51) Int. Cl.
*B23K 37/053*     (2025.01)
*B23K 26/08*     (2014.01)
*B23K 26/70*     (2014.01)
(52) U.S. Cl.
CPC ........ *B23K 37/053* (2013.01); *B23K 26/0823* (2013.01); *B23K 26/702* (2015.10)

(58) Field of Classification Search
CPC . B23Q 1/76; B23Q 1/621; B23Q 1/56; B23K 26/702; B23K 37/0538; B23K 26/0823; B23K 37/053
See application file for complete search history.

(56) References Cited

U.S. PATENT DOCUMENTS

| | | | | |
|---|---|---|---|---|
| 4,133,470 A | * | 1/1979 | Trail ................... | B23K 37/053 228/49.1 |
| 5,058,468 A | | 10/1991 | Lessway | |

(Continued)

FOREIGN PATENT DOCUMENTS

| | | |
|---|---|---|
| CH | 677332 A5 | 5/1991 |
| CH | 692607 A5 | 8/2002 |

(Continued)

*Primary Examiner* — Edward F Landrum
*Assistant Examiner* — Kuangyue Chen
(74) *Attorney, Agent, or Firm* — LEYDIG, VOIT & MAYER, LTD.

(57) ABSTRACT

A supporting device for supporting a workpiece for processing in a laser processing machine includes a base carrier having a guide body for fastening the supporting device in the laser processing machine, and a guide device provided on the base carrier for guiding the workpiece. The guiding device includes at least two guide elements, which are adjustable in distance to one another and on which the workpiece rests. The guide device has two slides, which are movable relative to the base carrier. At least one of the at least two guide elements is provided on each slide. The two slides are movable in coupled fashion, along two guides that are arranged at an angle to each other and are provided on the base carrier.

20 Claims, 4 Drawing Sheets

(56)                    References Cited

U.S. PATENT DOCUMENTS

| | | | |
|---|---|---|---|
| 5,373,136 | A | 12/1994 | Ernst et al. |
| 9,421,652 | B2 | 8/2016 | Tsai |
| 10,357,860 | B2 | 7/2019 | Rattunde |
| 2006/0163317 | A1 | 7/2006 | Wirth |
| 2008/0257938 | A1 | 10/2008 | Weil |
| 2010/0147810 | A1 | 6/2010 | Campana |
| 2011/0253686 | A1 | 10/2011 | Keel et al. |
| 2012/0279949 | A1 | 11/2012 | Simmons |
| 2017/0057018 | A1* | 3/2017 | Li ...................... B23K 26/384 |
| 2019/0054577 | A1* | 2/2019 | Vietz ................. B23K 37/0531 |

FOREIGN PATENT DOCUMENTS

| | | | |
|---|---|---|---|
| CN | 1863636 | A | 11/2006 |
| CN | 201483157 | U | 5/2010 |
| CN | 102019495 | A | 4/2011 |
| CN | 201988849 | U | 9/2011 |
| CN | 102806424 | A | 12/2012 |
| CN | 103157912 | A | 6/2013 |
| CN | 203140985 | U | 8/2013 |
| CN | 203316912 | U | 12/2013 |
| CN | 203418238 | U | 2/2014 |
| CN | 203830921 | U | 9/2014 |
| CN | 204449630 | U | 7/2015 |
| CN | 104874927 | A | 9/2015 |
| CN | 204893218 | U | 12/2015 |
| CN | 105345278 | A | 2/2016 |
| CN | 104526243 | B | 5/2016 |
| CN | 105665943 | A | 6/2016 |
| CN | 105773179 | A | 7/2016 |
| CN | 205414718 | U | 8/2016 |
| CN | 205520100 | U | 8/2016 |
| CN | 105945425 | A | 9/2016 |
| CN | 205614209 | U | 10/2016 |
| CN | 106077967 | A | 11/2016 |
| CN | 106238925 | A | 12/2016 |
| CN | 104308323 | B | 1/2017 |
| CN | 205888355 | U | 1/2017 |
| CN | 205927540 | U | 2/2017 |
| CN | 206047369 | U | 3/2017 |
| CN | 206393064 | U | 8/2017 |
| CN | 206455306 | U | 9/2017 |
| CN | 206643502 | U | 11/2017 |
| CN | 206764148 | U | 12/2017 |
| CN | 107627034 | A | 1/2018 |
| CN | 206952377 | U | 2/2018 |
| CN | 206966871 | U | 2/2018 |
| CN | 206966881 | U | 2/2018 |
| CN | 206966882 | U | 2/2018 |
| CN | 107813066 | A | 3/2018 |
| CN | 207289208 | U | 5/2018 |
| CN | 207326213 | U | 5/2018 |
| CN | 207358389 | U | 5/2018 |
| CN | 207358395 | U | 5/2018 |
| CN | 207858061 | U | 9/2018 |
| CN | 209598600 | U | 11/2019 |
| DE | 2547615 | A1 | 4/1977 |
| DE | 69014883 | T2 | 4/1995 |
| DE | 102010027927 | A1 | 10/2011 |
| DE | 102013108895 | B3 | 12/2014 |
| EP | 0634247 | A1 | 1/1995 |
| EP | 1982777 | A1 | 10/2008 |
| EP | 2000249 | A1 | 12/2008 |
| EP | 2633941 | A1 | 9/2013 |
| EP | 2377639 | B1 | 8/2015 |
| EP | 3042733 | A1 | 7/2016 |
| EP | 3067144 | A1 | 9/2016 |
| EP | 3292944 | A1 | 3/2018 |
| FR | 2676947 | A1 | 12/1992 |
| JP | S617095 | A | 1/1986 |
| JP | H 09136173 | A | 5/1997 |
| JP | H 1043974 | A | 2/1998 |
| JP | H 1058182 | A | 3/1998 |
| JP | 2001150175 | A | 6/2001 |
| JP | 2005152947 | A | 6/2005 |
| JP | 2006026758 | A | 2/2006 |
| JP | 2010201465 | A  * | 9/2010 |
| JP | 2012086243 | A | 5/2012 |
| JP | 2012086244 | A | 5/2012 |
| WO | WO 2008144829 | A1 | 12/2008 |

* cited by examiner

SUPPORTING DEVICE FOR A LASER PROCESSING MACHINE AND LASER PROCESSING MACHINE

CROSS REFERENCE TO RELATED APPLICATIONS

This application is a continuation of International Application No. PCT/EP2021/053221 (WO 2021/160678 A1), filed on Feb. 10, 2021, and claims benefit to German Patent Application No. DE 10 2020 103 484.9, filed on Feb. 11, 2020. The aforementioned applications are hereby incorporated by reference herein.

FIELD

The invention relates to a supporting device for supporting a workpiece for processing in a laser processing machine and to a laser processing machine for processing tubular workpieces.

BACKGROUND

JP 2010-201465 A1 has disclosed a laser processing machine for processing tubular workpieces. This laser processing machine comprises a handling device for handling the tubular workpieces during the tubular workpiece processing in a processing region. A laser head is movable within the processing region. The handling device comprises a rotatable clamping chuck and at least one supporting device for supporting the tubular workpiece during the processing. These supporting devices are accommodated in a longitudinally displaceable manner in the processing region. To support the tubular workpiece, the supporting device comprises two guide elements on a base carrier. These guide elements are adjustable independently of each other to the size of the tubular workpiece to be processed. The adjustment operation is complicated because of clamping screws for changing the position of the guide elements with respect to the base carrier.

JP 2005-152947 has furthermore disclosed a processing machine for processing tubular workpieces. The handling device comprises a rotatable clamping chuck and a supporting device. This supporting device consists of two guide levers with receiving parts arranged at the respective end. These guide levers are arranged in a scissors-like manner with respect to each other and are adjustable in distance to each other by a threaded spindle with a central hand wheel. This arrangement requires a large construction space. In addition, because of the rotational movement by way of a central hand wheel, there is no linear relationship to a change in the tubular diameter which has been set, and therefore the adjustment operation is made more difficult.

SUMMARY

Embodiments of the present invention provide a supporting device for supporting a workpiece for processing in a laser processing machine. The supporting device includes a base carrier having a guide body for fastening the supporting device in the laser processing machine, and a guide device provided on the base carrier for guiding the workpiece. The guiding device includes at least two guide elements, which are adjustable in distance to one another and on which the workpiece rests. The guide device has two slides, which are movable relative to the base carrier. At least one of the at least two guide elements is provided on each slide. The two slides are movable in coupled fashion, along two guides that are arranged at an angle to each other and are provided on the base carrier.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
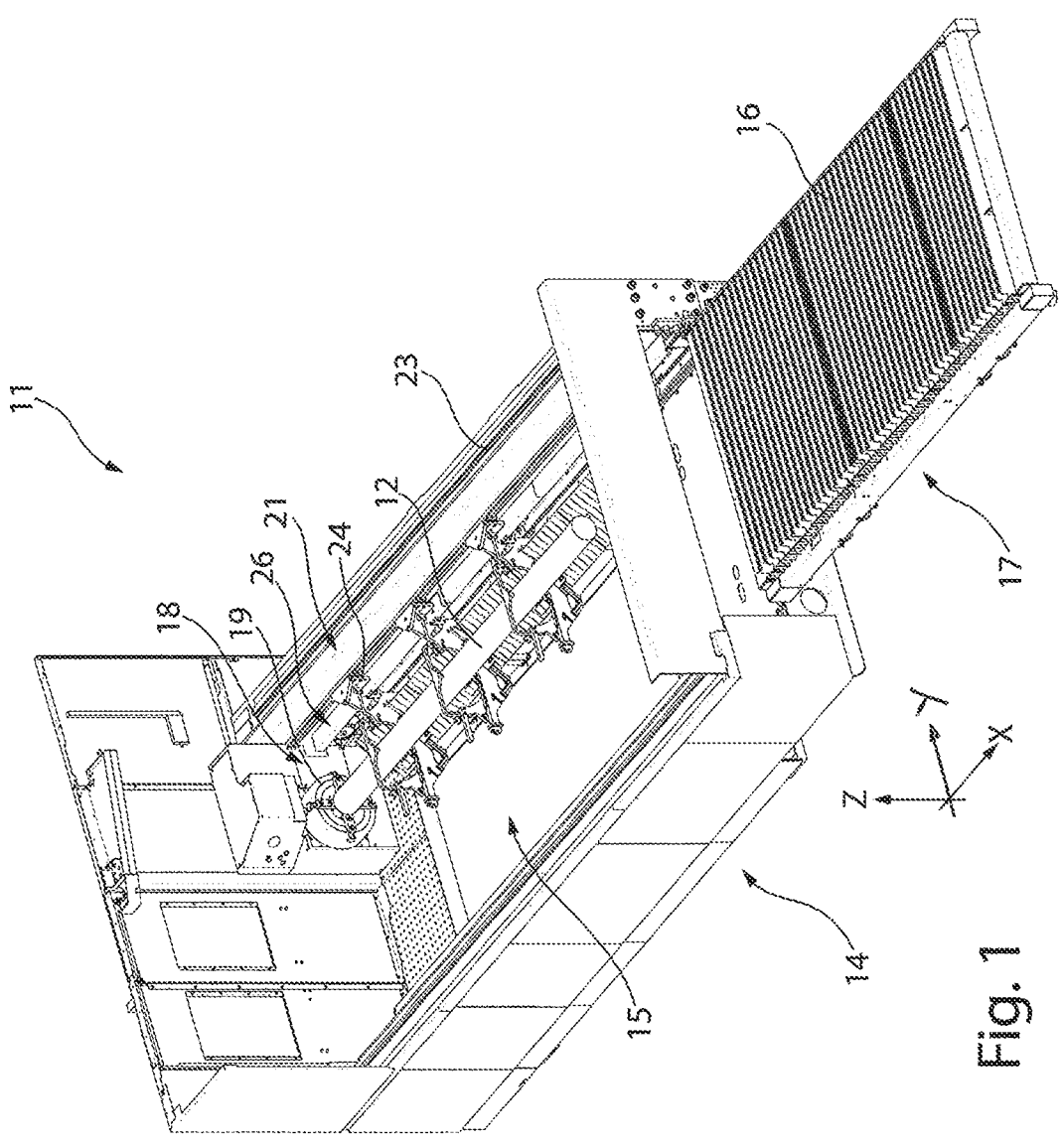
FIG. 1 shows a perspective view of a laser processing machine according to embodiments.

The invention is based on the object of proposing a supporting device for a laser processing machine and a laser processing machine, by means of which the supporting device can be handled simply and reliably for the processing of a tubular or profiled workpiece.

This object is achieved by a supporting device in which a guide device has two slides which are displaceable with respect to a base carrier, and at least one guide element is provided on each slide, and the slides of the guide device are movable relative to the base carrier, in particular in coupled fashion, along two guides which are arranged at an angle to each other. The two guides which are arranged at an angle to each other make it possible for the guide elements which are arranged on the slides to be adjustable relative to each other to different cross sections of the workpieces while maintaining the same distances on both sides in each case from the center axis of the tubular or profiled workpiece to be supported. Furthermore, by arranging the guides at an angle to each other, movement of the slides is made possible with a small construction space. In addition, a precise, repeatedly accurate adjustment of the distance between the guide elements in accordance with the cross section of the tubular or profiled workpiece arriving for processing is made possible.

Provision is preferably made for the guides of the guide device to be oriented at an angle of 90° to each other and to be arranged on the base carrier at an angle of 45° to a vertical. The vertical corresponds to the Z direction of a system of coordinates which is assigned to the laser processing machine and which is illustrated, for example, in FIG. 1. The distance between the guide elements can thereby be adjusted by the slides in a simple and precise way.

Furthermore, provision is preferably made for a running rail which is oriented horizontally to be provided separately on each slide for guiding purposes. In addition, a running roller assigned to the running rail is provided on the respective opposite slide and supported on the running rail of the other slide. The horizontal corresponds to the Y direction of a system of coordinates which is assigned to the laser machine and which is illustrated, for example, in FIG. 1. By means of this running rail on the one slide and the running roller on the other slide, said running roller being supported on the adjacent running rail, a supporting force can be improved. In addition, lever forces acting on the guides, which are arranged at an angle of 45° to the vertical, during the receiving of the workpiece can be reduced.

According to a preferred embodiment, provision is made for the two slides to be jointly movable and adjustable in distance to each other by a drive. As a result, a synchronous movement of the two slides relative to each other can be activated. The distance between the mutually opposite guide elements with respect to a vertical is therefore in each case the same in terms of amount, and thus the longitudinal axis of the workpiece can be precisely oriented with respect to the axis of rotation of a clamping chuck by means of the supporting devices which receive the workpiece. The two guide elements are oriented with respect to the vertical in such a manner that the vertical intersects the longitudinal axis or axis of rotation of the workpieces.

An advantageous refinement of the drive makes provision for the two slides to be driven with a threaded spindle. The threaded spindle preferably comprises a right-hand threaded portion and a left-hand threaded portion such that a simultaneous movement can be activated. Alternatively, provision can be made for the drive to comprise two threaded spindles, wherein one threaded spindle acts in each case on one slide and the rotational movement of the two threaded spindles is synchronized by the drive. The one threaded spindle or both threaded spindles can be moved manually. Alternatively, the drive can be activated electromotively.

An advantageous refinement of the drive makes provision for the latter to have a detection device, by means of which the distance between the slides and thus the diameter of the tubular or profiled workpiece can be detected. A signal can thereby be output to a display device, for example to a display. The operator can thus be assisted during the adjustment of the supporting device to the tubular workpiece to be processed. Provision can also be made for this signal of the detection device to be forwarded to a machine controller of the laser processing machine. This can enable automatic activation and adjustment of the supporting device to the tubular workpiece to be processed.

On the respective slide of the guide device, the guide elements are preferably oriented in a position between 40° and 50°, in particular 45°, to a vertical. This allows optimum support for receiving the tubular workpiece.

The guide elements are preferably designed as ball rollers. This permits a simplified displacement movement and rotational movement of the workpiece in the supporting device.

According to a further preferred embodiment of the supporting device, it is provided that on the base carrier opposite the guide device receiving elements for a guide disk are provided. Such a guide disk has an aperture through which tubes or profiles with a cross section differing from a round cross section are guided. By using such guide disks, the supporting device can enable increased flexibility in the processing of workpieces with non-round cross sections.

The receiving elements provided on the base carrier comprise at least running rollers on which the guide disk, with the workpiece guided therein, is supported rotatably about the longitudinal axis of the workpiece.

Furthermore, provision is preferably made for the rest elements to comprise at least two U-shaped holding elements, by means of which the guide disk is guided rotatably. Said U-shaped holding elements are preferably arranged opposite one another and at a distance from the running rollers such that the guide disk can simply be inserted from above and positioned in a rotating manner with respect to the base carrier.

The supporting device advantageously has a bow with at least one hold-down element, which is fastened releasably to the base carrier and is adjustable in height with respect to the guide elements. By means of the at least one hold-down element on the bow, the round tubular workpiece or the guide disk can be held down with respect to the base carrier. This permits exact guiding of the tubular or profiled workpieces to be processed by the supporting device.

According to a first embodiment of the bow for guiding cross-sectionally round workpieces, at least one hold-down element is oriented above and opposite the at least one guide element arranged on the respective slide, and therefore the hold-down element acts on the workpiece from above. The guide elements and the at least one hold-down element preferably lie in a common vertical plane.

Advantageously, a hold-down element is provided on the bow for round workpieces and is oriented with respect to the respective guide element on the slide in such a manner that a three-point rest for the tubular workpiece is provided by the hold-down element and the guide elements. Precise guidance of the tubular workpiece can thereby be achieved in a simple manner.

An alternative embodiment of the bow for holding the guide disk comprises at least one hold-down element which lies on an outer circumference of the guide disk and positions the guide disk rotatably with respect to the base carrier. The guide disk can thereby be held on the base carrier rotatably with respect to the running rollers. The running rollers are preferably oriented at an angle of between 40° and 50° with respect to the vertical in order to permit optimum support of the guide disk.

The object on which the invention is based is furthermore achieved by a laser processing machine, in particular laser flat bed machine, for selectively processing plate-like or tubular workpieces, which comprises a displacement device to which a workpiece rest, on which a plate-like workpiece rests, can be secured and which moves the workpiece rest in a processing region of the laser processing machine and out of same, and having a handling device for handling the tubular workpiece during the processing of the tubular workpiece in the processing region, and having a laser processing head which is movable within the processing region, wherein the handling device comprises at least one supporting device for supporting the tubular workpiece during the processing according to one of the above-described embodiments.

Embodiments of the invention will be described and explained in more detail below on the basis of the examples illustrated in the drawings. The features that can be gathered from the description and the drawings can be used individually by themselves or as a plurality in any combination according to embodiments of the invention.

FIG. 1 illustrates a perspective view of a laser processing machine 11. Said exemplary laser processing machine 11 is in the form of a laser flat bed machine for selectively processing plate-like or tubular workpieces or profiles. The laser processing machine 11 comprises a housing 14 in which a processing region 15 is provided. A laser processing head, not illustrated specifically, is movable within the processing region 15 in order, for example, to process a plate-like workpiece, not illustrated specifically, resting on a workpiece rest 16 or to process a workpiece 12 received by a handling device 18. The laser processing machine 11 illustrated in FIG. 1 is prepared for processing a tubular or profiled elongate workpiece 12. The workpiece rest 16 can be guided out of the processing region 15 by means of a displacement device 17, in particular a movable slide, and moved into a loading and unloading region arranged adjacent thereto, preferably outside the processing region 15, as illustrated in FIG. 1.

The handling device 18 of the laser processing machine 11 comprises a rotatable clamping chuck 19 and one or more supporting devices 21 which serve for supporting the tubular or profiled workpiece 12 during the processing. The rotatable clamping chuck 19 defines an axis of rotation about which the workpiece 12 can be rotated during the processing. This axis of rotation extends in the X direction. The supporting devices 21 are oriented such that the center axis of the tubular or profiled workpiece 12 coincides with the axis of rotation of the clamping chuck 19.

In the housing 14 of the laser processing machine 11, a guide rail 23 on which the supporting devices 21 are arranged displaceably runs in the X direction. A supporting device 21 preferably has a guide body 24 which is arranged movably on the guide rail 23. A chain drive 26 preferably extends parallel to the guide rail 23 and can be used to displace one or more supporting devices 21 along the guide rail 23. This chain drive 26 can activate a movement of the supporting devices 21 depending on the size or the length of the workpiece 12 to be processed.

Figures 2, 3:
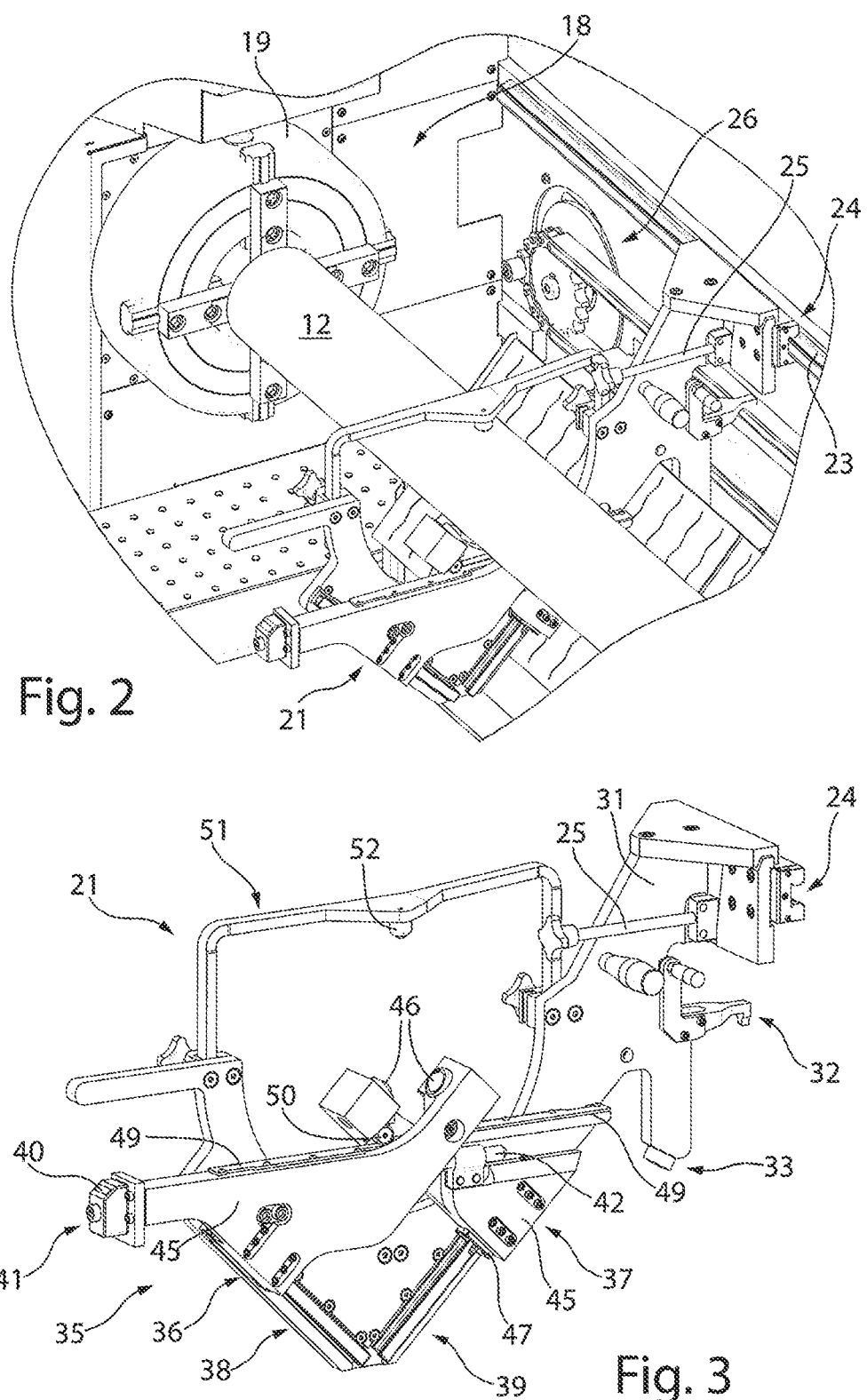
FIG. 2 shows a perspectively enlarged view of a handling device of the laser processing machine according to FIG. 1, according to embodiments.
FIG. 3 shows a perspective view of a supporting device of the handling device according to FIG. 2, according to embodiments.

FIG. 2 shows a perspectively enlarged view of the laser processing machine 11 according to FIG. 1. The one supporting device 21 is positioned, by way of example, close to the clamping chuck 19 in order to support the workpiece 12 clamped by the clamping chuck 19. The supporting device 21 illustrated in FIG. 2 is illustrated perspectively in FIG. 3 and as a side view in FIG. 4.

The supporting device 21 comprises a base carrier 31 which, by way of example, is of plate-like design. The guide body 24, by means of which the supporting device 21 is displaceable along the guide rail 23, is fastened to a lateral section of the base carrier 31. Provided adjacent thereto on the base carrier 31 is a closure element 32, by means of which the supporting device 21 is coupled to the chain drive 26 and is then movable along the guide rail 23. Preferably, a support element 33 is provided below the closure element 32 and/or at a distance from the guide body 24, the support element being supported on the laser processing machine 11 and by means of which, in interaction with the guide body 24, the supporting device 21 is held in a manner projecting freely into the processing region 15. By releasing a clamping element 25, e.g. a clamping screw, and opening the closure element 32, the supporting device 21 can be removed from the laser processing machine 11. The guide body 24 remains here in the laser processing machine 11.

A guide device 35 for guiding the tubular workpieces 12 is provided on the base carrier 31. The guide device 35 comprises two slides 36, 37 which are movable in an opposed manner with respect to each other. Each slide 36, 37 is guided movably on a guide 38, 39. The guide can be, for example, a linear guide, a sliding guide or the like. The guides 38, 39 are preferably oriented at an angle of 90° to each other. Furthermore, each guide 38, 39 is oriented at an angle of 45° to a vertical (Z direction).

In order to adjust a distance between the slides 36, 37, a drive 41 is provided. The drive 41 advantageously comprises a display device 40, on which the tube diameter which has been set is displayed, and a threaded spindle 42. The rotational movement of the threaded spindle 42 can be produced by hand, for example with the aid of a hexagon key. Alternatively, the drive can also be activated electromotively. The threaded spindle 42 acts simultaneously on both slides 36, 37. A first threaded portion 43 which is, for example, a right-hand threaded portion, is provided on the slide 36. A further threaded portion 44 which is, for example, a left-hand threaded portion, is provided on the further slide 37. By means of a rotational movement of the threaded spindle 42, a movement of the two slides 36, 37 away from each other or toward each other along the guides 38, 39 can be activated simultaneously. Guide elements 46 arranged on the slides 36, 37 can thereby each be arranged at the same distance from a vertical 48 running in between.

The guide elements 46 are arranged and oriented on the slides 36, 37 in such a manner that they are oriented at an angle of 40° to 50° to the vertical 48. This enables optimum support in respect of applied force and accuracy when a tubular workpiece rests thereon. The guide elements 46 are preferably designed as running balls. The latter can be provided exchangeably on the slides 36, 37.

Advantageously, the guides 38, 39 are in particular fastened to the base carrier 31 in order to absorb the forces or torques produced by the guide elements 46. The guides 38, 39 are fastened by clamping elements 55, for example countersunk head screws, which clamp the guides 38, 39 against a stop element 57 with the aid of a shaft 56. The clamping force of the countersunk head screws 55 which press with their head onto the shaft 56 from above is diverted to the side in the direction of the stop element 57.

Each slide 36, 37 comprises a slide body 45 which has the guide element 46 at one end. This end of the slide body 45 is gooseneck-shaped, and therefore the guide element 46 is oriented at an angle of 45° to the vertical 48. Opposite this end, the slide body 45 receives a running carriage 47 which is movable along the guide 38, 39. The slide bodies 45 of the slides 36, 37 are substantially similarly constructed in terms of geometry and oriented in a mirror-inverted manner with respect to each other, with the mirror plane being the vertical. This makes it possible, irrespective of the adjustment of the guide device 35, for each guide element 46 of the slide 36 to be oriented on one side of the vertical and also to remain oriented during the movement, and for the running carriage 47 of the slide 36 to be oriented on the opposite side of the vertical. This arrangement and orientation of the slide 36 with respect to the vertical 48 is maintained irrespective of the movement along the guide 38. The same applies to the slide 37.

Furthermore, each slide body 45 of the slide 36, 37 accommodates a running rail 49 which is oriented horizontally or is oriented in the Y direction and on which a running roller 50 of the adjacent slide 36, 37 is supported. As a result, the slides 36, 37 can be additionally mutually supported during a movement along the respective guide 38, 39. The respective running rails 49 on the slides 36, 37 are oriented parallel next to each other and in the same horizontal plane to each other. Said running rails 49 extend at right angles to the axis of rotation or longitudinal axis of the workpiece 12.

A bow 51 having at least one hold-down element 52 is preferably fastenable to the base carrier 31. The bow 51 is preferably insertable at receptacles on the base carrier 31 and is adjustable in height with respect to the base carrier 31 and fixed by means of at least one releasable fastening element 54. In order to guide round workpieces 22 and position same with respect to the guide elements 46, a hold-down element 52 is preferably provided on the bow 51. Said hold-down element preferably lies on the vertial. As a result, a three-point rest is formed for the tubular workpiece to be held. Advantageously, the hold-down element 52 is likewise designed as a ball roller.

Figures 4, 5, 6:
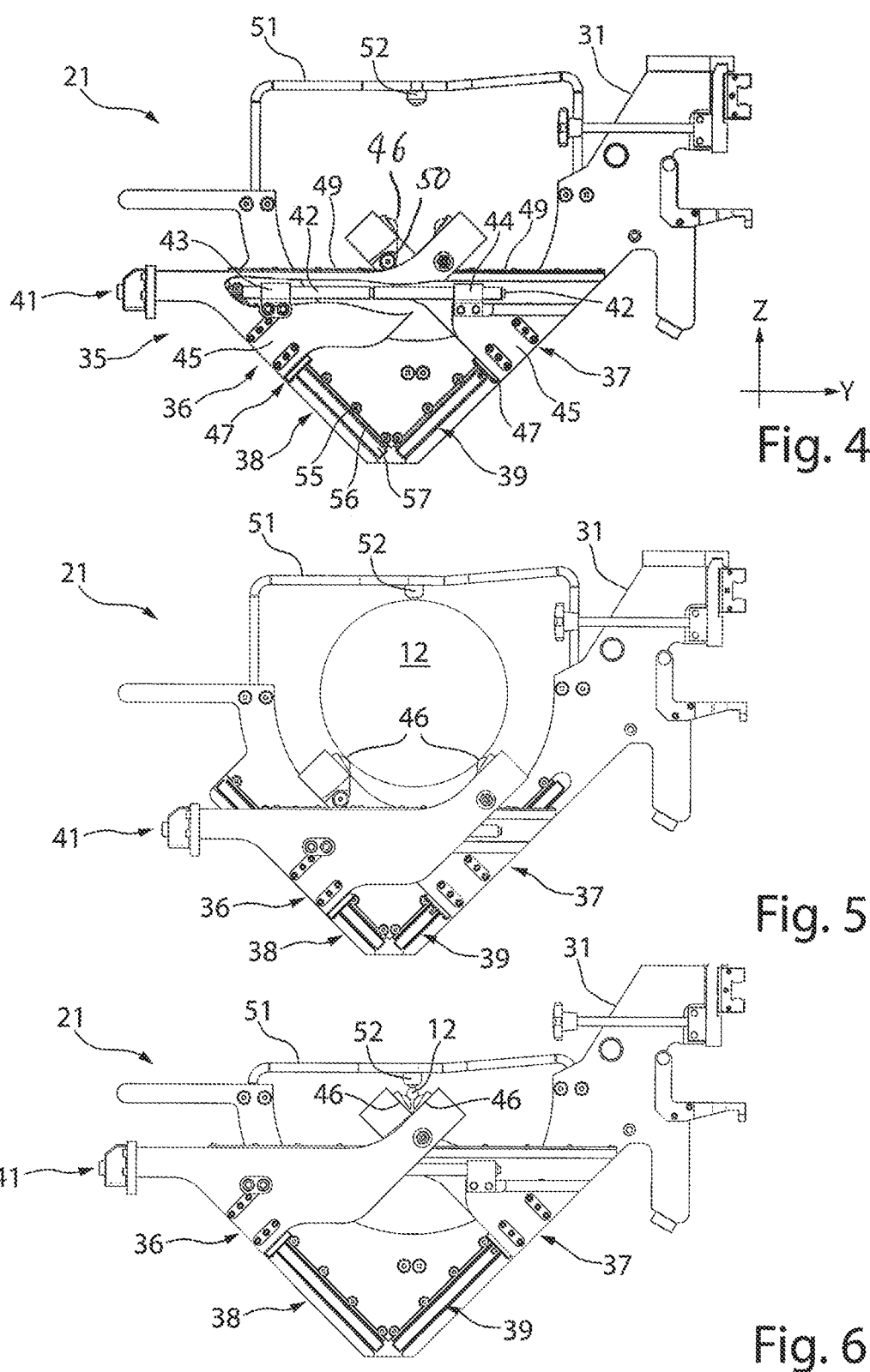
FIG. 4 shows a schematic side view of the supporting device according to FIG. 3 with a partial sectional view, according to embodiments.
FIG. 5 shows a schematic side view of the supporting device in an intermediate position for receiving a tubular workpiece, according to embodiments.
FIG. 6 shows a schematic side view of the supporting device according to FIG. 3 with a minimal adjustment position for receiving a workpiece, according to embodiments.

FIG. 5 illustrates a schematic side view of the supporting device 21 for receiving a tubular workpiece 12 that is to be processed and has a large diameter. FIG. 6 illustrates a schematic side view of the supporting device 21 for receiving the smallest possible diameter of a tubular workpiece 12. It is clear, by comparing these two positions of the guide device 35, that a small construction space for the supporting device 21 is required in order to receive tubular workpieces 12 with a diameter of differing size. Furthermore, it can be seen that the bow 51 can be fastened variably in height, depending on the diameter of the workpiece 12, to the base carrier 31.

Figure 7:
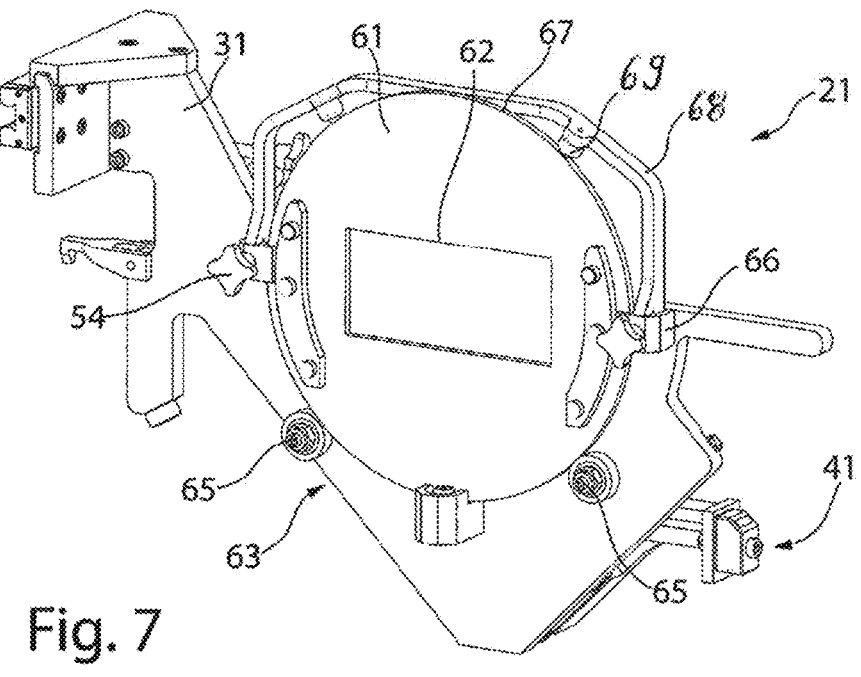
FIG. 7 shows a perspective view of the supporting device according to FIG. 3 for processing tubular workpieces and profiles with a non-round cross section, according to embodiments.
Figure 8:
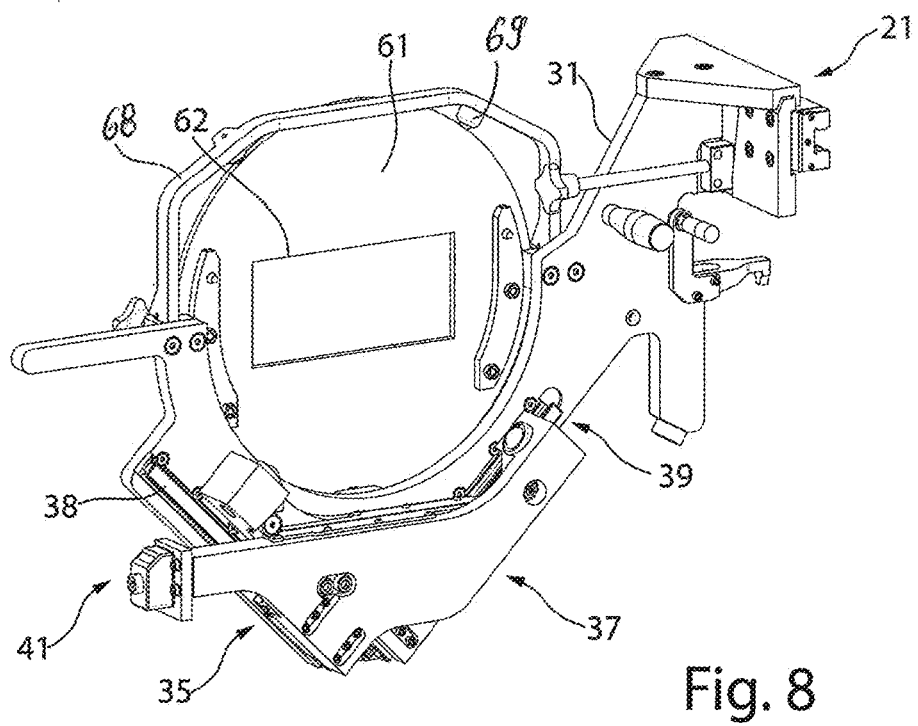
FIG. 8 shows a further schematic side view of the supporting device according to FIG. 7, according to embodiments.

By means of the arrangement of the guides 38, 39 and the design of the drive 41, it is ensured that the position of the axis of the workpiece 12, irrespective of the size of the latter, coincides with the axis of rotation of the clamping chuck 19. FIG. 7 illustrates a first schematic side view of the supporting device 21 for supporting a profiled workpiece with a cross section which differs from a round cross section. FIG. 8 shows a further opposite side view of the supporting device 21 according to FIG. 7. For guiding tubes or profiles with a cross section differing from a round cross section, use is made of a guide disk 61 which has an aperture 62 which is adapted to the cross section of the workpiece 12 to be processed in order to guide said workpiece 12. Receiving elements 63 are provided for rotationally receiving said guide disk 61 with respect to the base carrier 31. Said receiving elements 63 can be designed, for example, as at least two running rollers 65 which are fastened to the base carrier 31. Said running rollers 65 are preferably oriented at an angle of between 40° and 50° to the vertical. There can thereby be optimum support during the rotatable receiving of the guide disk 61. The receiving elements 63 can furthermore comprise U-shaped holding elements 66. The latter can be fastened to the base carrier 31, for example, oriented opposite each other and preferably horizontally to each other. In addition, a further U-shaped holding element 66 can also be fastened to the base carrier 31, the holding element, for example, supporting the guide disk 61 vertically. As a result, the guide disk 61 is guided freely rotatably in a vertical orientation with respect to the base carrier 31. During a rotational movement of the guide disk 61, the latter can be supported on the running rollers 65.

For precise guidance of workpieces 12 with a non-round cross section by means of a guide disk 61, the bow 68 with at least one hold-down element 69 can be additionally arranged on the base carrier 31. The at least one hold-down element 69 is arranged here on the bow 68 in such a manner that the at least one hold-down element 69 acts on an externally peripheral running surface 67 of the guide disk 61. Said running surface 67 of the guide disk 61 is also supported on the running rollers 65. In the exemplary embodiment, two hold-down elements 69 which are positioned analogously to the running rollers 65 are illustrated on the bow 68. Alternatively, just one hold-down element 69 lying on a vertical 48 can be provided on the bow 68.

When the guide disk 61 of the supporting device 21 is used, the guide device 35 is preferably arranged in a position such that the guide elements 46 lie outside a rotational region of the aperture 62 of the guide disk 61.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A supporting device for supporting a workpiece for processing in a laser processing machine, the supporting device comprising:

a base carrier having a guide body for fastening the supporting device in the laser processing machine, a guide device provided on the base carrier for guiding the workpiece, the guide device comprising at least two guide elements, which are adjustable in distance to one another and on which the workpiece rests, wherein:

the guide device has two slides, which are movable relative to the base carrier, each respective slide of the two slides includes at least one of the at least two guide elements provided thereon the two slides are movable in coupled fashion, along two guides that are arranged at an angle to each other and are provided on the base carrier, and each respective slide of the two slides has a running rail that is oriented horizontally and a running roller, the running roller of each respective slide of the two slides being supported by the running rail of a respective opposite slide of the two slides.

2. The supporting device as claimed in claim 1, wherein the two guides are oriented at an angle of 90° to each other and are arranged on the base carrier at an angle of 45° to a vertical.

3. The supporting device as claimed in claim 1, wherein the two slides are jointly movable and adjustable in distance to each other by a drive.

4. The supporting device as claimed in claim 3, wherein the drive is formed by a threaded spindle with a right-hand threaded portion arranged on one of the two slides and with a left-hand threaded portion arranged on another one of the two slides.

5. The supporting device as claimed in claim 3, wherein the drive has a detection device configured to detect a distance between the slides.

6. The supporting device as claimed in claim 5, wherein the detection device is configured to output a diameter of the workpiece in a form of a detected signal to a display device and/or to a machine controller of the laser processing machine.

7. The supporting device as claimed in claim 1, wherein at least one of the at least two guide elements is oriented on a respective slide of the two slides in a position between 40° and 50° to vertical.

8. The supporting device as claimed in claim 7, wherein the workpiece is a cross-sectionally round and wherein the at least one of the at least two guide elements that is oriented on the respective slide of the two slides in the position between 40° and 50° to vertical is configured to support the cross-sectionally round workpiece.

9. The supporting device as claimed in claim 1, wherein the at least two guide elements are designed as ball rollers.

10. The supporting device as claimed in claim 1, wherein the workpiece is tubular or profiled with a cross-section differing from a round cross section, wherein, on the base carrier opposite the guide device, receiving elements for a guide disk are provided with an aperture, through which the workpiece is guided.

11. The supporting device as claimed in claim 10, wherein the receiving elements are designed as a ball roller or running roller, by means of which the guide disk with the workpiece guided therein is mounted rotatably about a longitudinal axis of the workpiece.

12. The supporting device as claimed in claim 10, wherein the receiving elements are designed as U-shaped holding elements, by means of which the guide disk is held rotatably with respect to the base carrier.

13. The supporting device as claimed in claim 10, wherein a bow is fastened releasably to the base carrier and has at least one hold-down element, by means of which the work-piece or the guide disk is held with respect to the base carrier.

14. The supporting device as claimed in claim 13, wherein the at least one hold-down element is arranged on the bow and is oriented opposite the at least two guide elements and acts on the workpiece.

15. The supporting device as claimed in claim 13, wherein the bow for the guide disk has the at least one hold-down element, and wherein the at least one hold-down element lies on an outer circumferential surface, which is in a form of a running surface, of the guide disk and positions the guide disk rotatably with respect to the base carrier.

16. A laser processing machine for selectively processing a plate-like workpiece and a tubular workpiece, the laser processing machine comprising:

a displacement device to which a workpiece rest, on which the plate-like workpiece rests, can be fastened in order to move the workpiece rest into and out of a processing region of the laser processing machine, a handling device for handling the tubular workpiece for processing the tubular workpiece in the processing region, the handling device having at least one supporting device for supporting the tubular workpiece for the processing, and a laser processing head which is movable within the processing region, wherein the at least one supporting device is designed as claimed in claim 1.

17. The supporting device as claimed in claim 1, wherein the running rollers of each respective slide of the two slides are configured to roll horizontally along the running rail of the respective opposite slide of the two slides.

18. The supporting device as claimed in claim 1, wherein the running rails of each respective slide of the two slides extend in a same horizontal plane, the horizontal plane extending parallel to a longitudinal axis the workpiece.

19. The supporting device as claimed in claim 1, wherein the two slides are movable in coupled fashion such that movement of one of the two slides causes synchronous movement of both of the two slides.

20. The supporting device as claimed in claim 4, wherein the right-hand threaded portion and the left-hand threaded portion are coaxial, and wherein the threaded spindle extends coaxially with and through both the right-hand threaded portion and the left-hand threaded portion.

* * * * *